United States Patent
France et al.

(10) Patent No.: US 8,773,465 B2
(45) Date of Patent: Jul. 8, 2014

(54) METHODS AND APPARATUS FOR PROVIDING NAVIGATIONAL INFORMATION ASSOCIATED WITH LOCATIONS OF OBJECTS

(75) Inventors: Peter France, Christchurch (NZ); Kevin Sharp, Christchurch (NZ); Stuart Ralston, Christchurch (NZ)

(73) Assignee: Trimble Navigation Limited, Sunnyvale, CA (US)

(*) Notice: Subject to any disclaimer, the term of this patent is extended or adjusted under 35 U.S.C. 154(b) by 899 days.

(21) Appl. No.: 12/558,080

(22) Filed: Sep. 11, 2009

(65) Prior Publication Data
US 2011/0066375 A1 Mar. 17, 2011

(51) Int. Cl.
*G06F 3/00* (2006.01)
*A63F 13/06* (2006.01)

(52) U.S. Cl.
USPC ........... 345/633; 701/408; 701/438; 701/541; 701/487; 345/629; 345/632

(58) Field of Classification Search
CPC ............ G06F 3/00; G06F 3/011; A63F 13/06
USPC .......... 701/213, 408, 538, 541, 487; 345/633, 345/629, 632
See application file for complete search history.

(56) References Cited

U.S. PATENT DOCUMENTS

| | | | |
|---|---|---|---|
| 5,642,285 A | 6/1997 | Woo et al. | |
| 5,739,785 A | 4/1998 | Allison et al. | |
| 6,052,083 A | 4/2000 | Wilson | |
| 6,094,625 A | 7/2000 | Ralston | |
| 6,140,957 A | 10/2000 | Wilson et al. | |
| 6,147,598 A | 11/2000 | Murphy et al. | |
| 6,282,362 B1 | 8/2001 | Murphy et al. | |
| 6,304,210 B1 | 10/2001 | Allison et al. | |
| 6,330,503 B1 | 12/2001 | Sharp et al. | |
| 6,480,148 B1 | 11/2002 | Wilson et al. | |
| 7,339,611 B2 | 3/2008 | Marold et al. | |

(Continued)

FOREIGN PATENT DOCUMENTS

| | | |
|---|---|---|
| DE | 19922321 C2 | 7/2002 |
| EP | 1936323 A2 | 6/2008 |

(Continued)

OTHER PUBLICATIONS

Luhmann et al; "Close Range Photogrammetry" 2006, 510 pages, Whittles Publishing, ISBN 0-470-10633-6.

(Continued)

*Primary Examiner* — Adam Tissot
(74) *Attorney, Agent, or Firm* — Kilpatrick Townsend & Stockton LLP (57) ABSTRACT

An apparatus for providing navigational information associated with locations of objects includes an imaging device configured to acquire image data, a visual display coupled to the imaging device and configured to display the image data, a position measuring device configured to determine position information associated with the imaging device, and an orientation device configured to determine orientation information associated with the imaging device. The apparatus may also include a rendering system coupled to the visual display, the position measuring device, and the orientation device. The rendering system may be configured to determine image coordinates associated with a location of an object and provide a navigational graphic on the visual display oriented relative to the image coordinates.

20 Claims, 9 Drawing Sheets

(56) References Cited

U.S. PATENT DOCUMENTS

| | | |
|---|---|---|
| 7,541,974 B2 | 6/2009 | Scherzinger |
| 7,619,561 B2 | 11/2009 | Scherzinger |
| 7,697,127 B2 | 4/2010 | Vogel et al. |
| 7,719,467 B2 | 5/2010 | Norda et al. |
| 2005/0125142 A1 | 6/2005 | Yamane |
| 2006/0038833 A1* | 2/2006 | Mallinson et al. ............ 345/633 |
| 2007/0010924 A1 | 1/2007 | Otani et al. |
| 2007/0035563 A1* | 2/2007 | Biocca et al. ................. 345/633 |
| 2009/0138233 A1 | 5/2009 | Kludas et al. |
| 2009/0220144 A1 | 9/2009 | Mein et al. |
| 2009/0262974 A1 | 10/2009 | Lithopoulos |
| 2010/0141759 A1 | 6/2010 | Scherzinger |
| 2010/0172546 A1 | 7/2010 | Sharp |
| 2010/0174507 A1 | 7/2010 | Vogel et al. |

FOREIGN PATENT DOCUMENTS

| | | |
|---|---|---|
| EP | 1944572 A1 | 7/2008 |
| WO | WO 2007/031248 A2 | 3/2007 |
| WO | WO 2009/100773 A1 | 8/2009 |
| WO | WO 2009/100774 A1 | 8/2009 |
| WO | WO 2009/103342 A1 | 8/2009 |
| WO | WO 2009/106141 A1 | 9/2009 |
| WO | WO 2010/080950 A1 | 7/2010 |

OTHER PUBLICATIONS

"User Manual for Australis" Photometrix, Oct. 7, 2007; 76 pages, www.photometrix.com.au.

Layar: First Mobile Augmented Reality Browser is Your Real Life Hud; Dec. 14, 2009; retrieved from http://gizmodo.com/5292748/layar-first-mobile-augmented-reality-browser-is-your-real-life-hud.

Layar: First Mobile Augmented Reality Browser is Your Real Life Hud; Youtube; Dec. 14, 2009; retrieved from http://www.youtube.com/watch?v=b64__16K2e08.

* cited by examiner

METHODS AND APPARATUS FOR PROVIDING NAVIGATIONAL INFORMATION ASSOCIATED WITH LOCATIONS OF OBJECTS

BACKGROUND OF THE INVENTION

The present invention relates generally to methods and apparatus for providing navigational information for visual guidance to locations of objects or points. Merely by way of example, embodiments of the present invention provide apparatus for providing guidance information using navigational graphics overlaid on a real-time video display. Such embodiments may be used, for example, in surveying, mapping, construction, or other location determination applications. The scope of embodiments of the present invention, however, is broader than this particular application and can be applied to other applications.

Traditional surveying may involve two operators working with a theodolite and range pole or a more complex optical/electronic total station. One operator generally positions the theodolite over a known point while the other operator holds the range pole at a series of known or unknown points whose locations are to be checked or measured. A prism mounted on the range pole is sighted through the theodolite and accurate angular and distance measurements to the prism are obtained at each point. The locations of the points can be determined using triangulation techniques.

An approximately analogous process takes place in modern satellite based surveying. Current techniques may involve a single operator moving about with a roving antenna/receiver or global navigation satellite system (GNSS) total station. The roving antenna may be carried on a range pole that is held by the operator. The operator stops on various points to record location information determined using signals transmitted by satellite sources. Correction data may be transmitted from a reference site through a telemetry system.

The satellite positioning system most commonly used today is the Global Positioning System (GPS), although others such as the Global Orbiting Navigation System (GLONASS) are also in use or under development. Some land based systems that use non-satellite signal sources to simulate satellite systems over a small area are also in use. GPS is based on a constellation of between 24 and 32 satellites operated by the United States Department of Defense. The satellite positions are monitored closely and act as reference points from which an antenna/receiver in the field is able to determine position information. By measuring the travel time of signals transmitted from a number of satellites, the receiver is able to determine corresponding distances from the satellites to the phase center of the antenna. The receiver is able to determine the position of the phase center of the antenna by trilateration.

Surveyors and other operators carrying out survey related work use a range of equipment and procedures. A surveyor in the field typically carries a survey control device that provides an interface to the receiver. He or she generally navigates around a site setting out or checking the layout of survey points and recording attribute information for existing features using the control device. The efficiency of surveyors and operators can be improved by simplifying the process of identifying objects or points and reducing the time required to navigate between points. Thus, there is a need for improved methods and apparatus for providing navigational information associated with locations of objects or points.

SUMMARY OF THE INVENTION

The present invention provides improved methods and apparatus for providing navigational information associated with locations of objects or points. Merely by way of example, embodiments of the present invention provide apparatus for providing guidance information using navigational graphics overlaid on a real-time video display. Such embodiments may be used, for example, in surveying applications. However, the scope of embodiments of the present invention is broader than this particular application and can be applied to other applications.

According to an embodiment of the present invention, an apparatus for providing navigational information associated with locations of objects is provided. The apparatus may comprise an imaging device configured to acquire image data, a visual display coupled to the imaging device and configured to display the image data, a position measuring device configured to determine position information associated with the imaging device, and an orientation device configured to determine orientation information associated with the imaging device. The apparatus may also comprise a rendering system coupled to the visual display, the position measuring device, and the orientation device. The rendering system may be configured to determine image coordinates associated with a location of an object and provide a navigational graphic on the visual display oriented relative to the image coordinates.

According to another embodiment of the present invention, a method of providing navigational information associated with locations of objects is provided. The method includes acquiring image data using an imaging device, determining position information associated with a position of the imaging device, determining orientation information associated with an orientation of the imaging device, and obtaining location information associated with the location of the object. The method also includes determining image coordinates associated with the location of the object and providing a navigational graphic on a visual display oriented relative to the image coordinates.

Numerous benefits are achieved using the present invention over conventional techniques. For example, an embodiment according to the present invention provides a simple instrument for providing guidance to locations of objects using video images. The video images allow objects or points to be quickly identified and easily located. The instrument may be used, for example, by operators to identify points, to navigate between points, or to avoid danger areas.

Depending upon the embodiment, one or more of these benefits may exist. These and other benefits are described throughout the specification and more particularly below.

DETAILED DESCRIPTION OF THE INVENTION

Embodiments of the present invention provide methods and apparatus for providing navigational information associated with locations of objects or points. As an example, in a particular embodiment a navigational graphic is overlaid on a real-time video image to identify a location of an object or point in the video image. The video image may correspond to an operator's field of view, and the navigational graphic may be, for example, an arrow identifying a location of an object in the video image corresponding to the actual location of the object in the environment. In some embodiments the navigational graphic may be displayed in a particular orientation to assist in navigation from the current position to the location of the object. These and other embodiments of the present invention are described more fully below.

Figure 1:
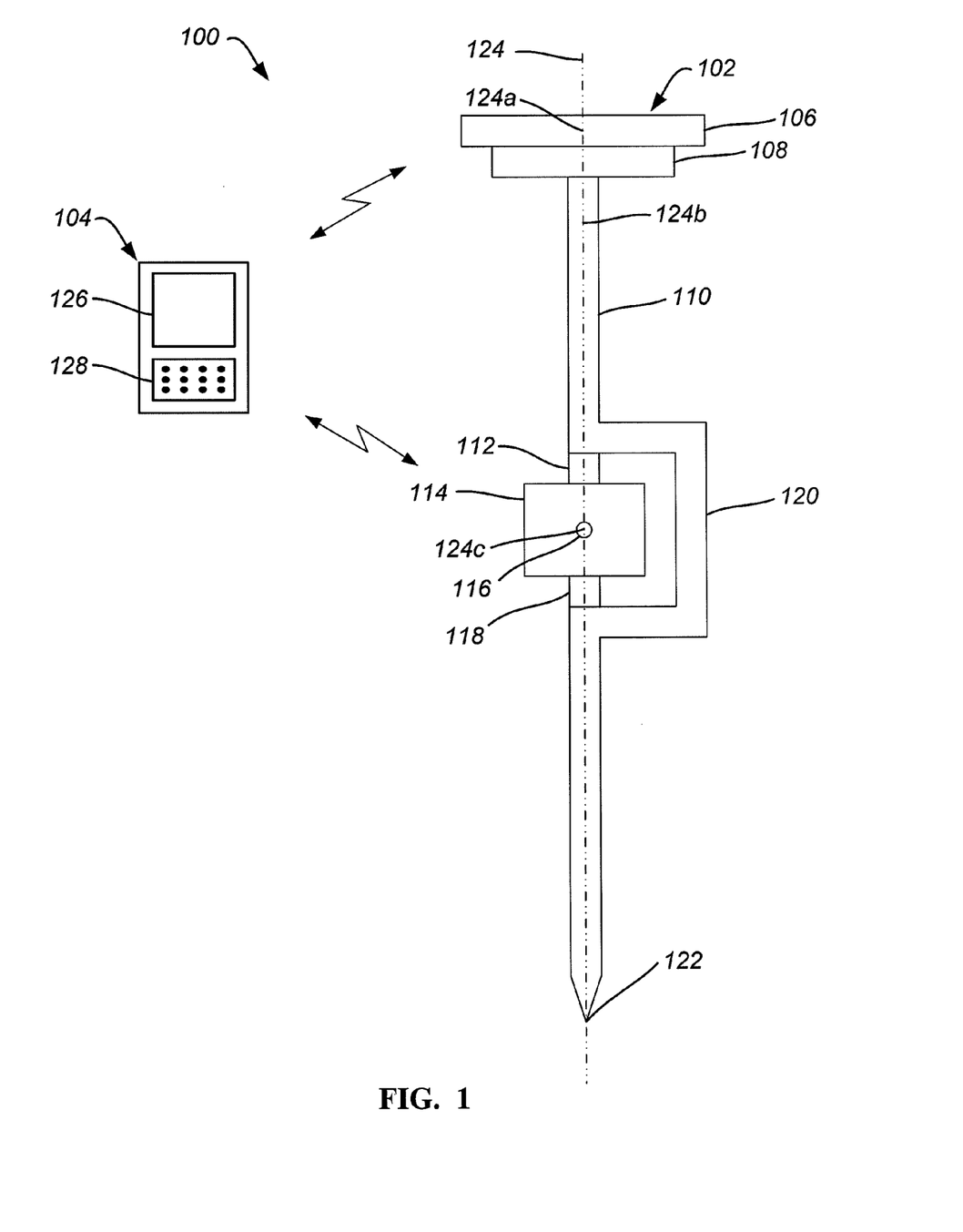
FIG. 1 is a simplified diagram of an apparatus for providing navigational information associated with locations of objects according to an embodiment of the invention.

FIG. 1 is a simplified diagram of an apparatus 100 for providing navigational information associated with locations of objects according to an embodiment of the invention. The apparatus 100 includes a measurement pole 102 and a control device 104. In the exemplary embodiment illustrated in FIG. 1, the measurement pole 102 includes an antenna 106, a receiver 108, and an imaging device 114. In this example, the antenna 106 and the receiver 108 are mounted to an upper section 110 of the measurement pole 102, and the imaging device 114 is mounted to a middle section 120 of the measurement pole 102. It is to be understood that FIG. 1 is provided merely as an example, however, and other arrangements are included within the scope of embodiments of the present invention.

The antenna 106 may be a satellite or telemetry antenna configured to receive signals used to determine position information. In an embodiment the antenna 106 is a GNSS antenna configured to receive signals from satellites. The antenna 106 receives the signals and passes data to the receiver 108 for processing.

The receiver 108 may be configured to receive data from the antenna 106 and process the data to determine position information. The receiver 108 typically includes a processor, a memory, and a clock, and is configured to determine position information in accordance with known techniques. In an embodiment the receiver 108 is a GNSS receiver configured to determine position information. As an example, the receiver 108 may be configured to determine the position of the phase center 124a of the antenna 106. The phase center 124a of the antenna 106 and the vertical axis 124b of the measurement pole 102 are typically aligned along axis 124. Contact point 122 may also be aligned along axis 124. Some embodiments also include one or more tilt sensors used to determine an angle and orientation of axis 124 relative to the local gravity vector. The tilt sensor may include a bubble level, an accelerometer, one or more gyros, a plumb bob, a tilt meter, or the like. The position of a point on the ground may be determined by placing the contact point 122 on the point, determining a position of the phase center 124a of the antenna 106 and a tilt and orientation of the measurement pole 102, and accounting for the offset between the contact point 122 and the position of the phase center 124a of the antenna 106 in accordance with known techniques. The receiver 108 may be configured to send the position information to the control device 104. The receiver 108 and the control device 104 may be coupled via wired or wireless connections.

In some embodiments the position of the measurement pole 102 may be determined using an optical/electronic total station. For example, the measurement pole 102 may include a prism that enables the position of the measurement pole 102 to be tracked. The prism may be in place of, or in addition to, the receiver 108 and the antenna 106. This allows position information to be obtained in areas or locations where GNSS signal reception is poor or unavailable.

The receiver 108 may also include an orientation device configured to determine an orientation of the measurement pole 102 about a vertical axis defined by the local gravity vector.

Alternatively, the orientation device may be separate from receiver 108 and may be, for example, coupled to measurement pole 102 or integrated with imaging device 114. In an embodiment the orientation device is a compass, magnetometer with one or more gyros, or the like and is configured to provide orientation information to the control device 104. The orientation device may be coupled with the control device 104 via wired or wireless connections. In other embodiments the orientation device may comprise a software based system configured to determine orientation information, such as heading, based on position information received from the receiver 108. For example, orientation information may be determined based on the movement of the measurement pole 102 in accordance with known techniques. Such an orientation device may be integrated with the receiver 108 or with the control device 104.

The measurement pole 102 also includes an imaging device 114. The imaging device 114 may be a digital camera configured to acquire image data. For example, in an embodiment the imaging device 114 is a digital video camera that uses solid-state CCD or CMOS image sensors to capture image data. The imaging device 114 may be coupled to the measurement pole 102 using upper and lower mounts 112 and 118 as shown in the exemplary embodiment illustrated in FIG. 1. The imaging device 114 may include a visual display configured to display the image data. The imaging device 114 may also be coupled with control device 104 and be configured to send the image data to the control device 104 for display on visual display 126. The imaging device 114 and the control device 104 may be coupled via wired or wireless connections.

In an embodiment the position, orientation, and/or tilt of the optical center 124c may be determined by determining a position of the phase center 124a of the antenna 106 and a tilt and orientation of the measurement pole 102, and accounting for the offset between the optical center 124c and the phase center 124a in accordance with known techniques.

In an embodiment, upper and lower mounts 112 and 118 may be configured to allow the imaging device 114 to rotate about a horizontal axis. Rotation about the horizontal axis changes the pitch, and thus the field of view, of the imaging device 114. Alternatively, the lens of the imaging device may swivel and thus allow for changes in the field of view of the imaging device 114. In either configuration, a tilt sensor or fixed scales may be used to determine the angle of rotation about a horizontal axis. The angle of rotation of the imaging device 114 may be changed to view objects or points that are near the contact point 122.

The apparatus 100 shown in FIG. 1 also includes a control device 104. In some embodiments the control device 104 may be integrated with the imaging device 114. The exemplary control device 104 shown in FIG. 1 includes a visual display 126 and an input device 128. The visual display 126 may be configured to display the image data. The input device 128 may include a keyboard, touchscreen, touchpad, or the like and be configured to enable data input or retrieval. The control device 104 typically includes a processor and memory and may be configured to receive position information from the receiver 108, image data from the imaging device 114, and orientation information from the orientation device. Additionally, the control device 104 may store and access object information in local memory or a remote database. In an embodiment the object information may include GNSS coordinates of an object. The GNSS coordinates may be entered by the operator or selected from previously performed measurements using the input device 128. The object information may also comprise a digital model of the surrounding environment. The digital model may comprise locations of points measured, for example, using an optical/electronic total station. The digital model may be used to select objects or points of interest. For example, in an embodiment the operator may select a mode that displays the digital model in a plan view (e.g., map view) on the visual display 126. The operator may select the object or point of interest using, for example, a cursor or touchscreen. The operator may then select a mode that displays the image data. As explained more fully below, a navigational graphic may be superimposed on the image data that provides navigational information associated with the location of the object or point. The object information may include attribute data associated with the object. For example, the attribute data may include information or notes prepared beforehand or added by the operator during the current work.

The control device 104 may also include a software or hardware based rendering system configured to determine the image coordinates associated with a location of an object or point. For example, the rendering system may be configured to determine the image coordinates corresponding to the actual location of an object or point in space. The image coordinates may define a two-dimensional plane that includes points within the field of view of the imaging device 114 as well as points that are outside the field of view of the imaging device 114.

For points within the field of view of the imaging device, the rendering system may be configured to determine the portion of the image data (e.g., one or more pixels) associated with the actual location of the object or point in the environment. The rendering system may superimpose one or more navigational graphics on the visual display 126 oriented relative to the portion of the image data associated with the location of the object. For example, a navigational graphic in the form of an arrow may be superimposed on the image data extending towards or pointing to the portion of the image data associated with the location of the object or point.

For points outside the field of view of the imaging device, the rendering system may be configured to determine the image coordinates associated with the actual location of the object or point in the environment. The rendering system may superimpose one or more navigational graphics on the visual display 126 oriented relative to the image coordinates associated with the location of the object. For example, a navigational graphic in the form of an arrow may be superimposed on the image data extending towards the image coordinates. In this case the navigational graphic may indicate a direction to move the imaging device to bring the object or point within the field of view.

In an embodiment the image coordinates associated with the location of the object are determined by a series of linear transforms. The three-dimensional coordinates of the point or object in space may be transformed to two-dimensional image coordinates in an image plane. For example, the location of the object may be defined relative to a world coordinate frame represented as $P_{wrtW}$ (or P with respect to a world coordinate frame W). $P_{wrtW}$ represented by the homogeneous 4-vector $[P_{x,wrtW} \ P_{y,wrtW} \ P_{z,wrtW} \ 1]^T$, where the transpose T indicates a column vector. Similarly, the location of the object may be defined in relation to a navigation coordinate frame as $P_{wrtN}$ (or P with respect to a navigation coordinate frame). The location P may be transformed from the world coordinate frame to the navigation coordinate frame (denoted as $X_{W \to N}$) using the homogeneous linear transform $P_{wrtN} = X_{W \to N} \cdot P_{wrtW}$.

The navigation coordinate frame may be defined as a coordinate frame translated from the world coordinate frame by a displacement indicated by a position measuring device and a rotation indicated by orientation and/or rotation devices. The orientation may be defined as a yaw $\theta_z$ (rotation about the z-axis), pitch $\theta_y$ (rotation about the y-axis), and roll $\theta_x$ (rotation about the x-axis), and the transform may be determined as:

$$X_{W \to N} = \begin{bmatrix} 1 & 0 & 0 & 0 \\ 0 & \cos(-\theta_x) & -\sin(-\theta_x) & 0 \\ 0 & \sin(-\theta_x) & \cos(-\theta_x) & 0 \\ 0 & 0 & 0 & 1 \end{bmatrix} \begin{bmatrix} \cos(-\theta_y) & 0 & \sin(-\theta_y) & 0 \\ 0 & 1 & 0 & 0 \\ -\sin(-\theta_y) & 0 & \cos(-\theta_y) & 0 \\ 0 & 0 & 0 & 1 \end{bmatrix}$$

$$\begin{bmatrix} \cos(-\theta_z) & -\sin(-\theta_z) & 0 & 0 \\ \sin(-\theta_z) & \cos(-\theta_z) & 0 & 0 \\ 0 & 0 & 1 & 0 \\ 0 & 0 & 0 & 1 \end{bmatrix} \begin{bmatrix} 1 & 0 & 0 & -T_x \\ 0 & 1 & 0 & -T_y \\ 0 & 0 & 1 & -T_z \\ 0 & 0 & 0 & 1 \end{bmatrix}$$

where $[T_x \ T_y \ T_z]$ is the translation of the navigation coordinate frame from the world coordinate frame.

The navigation coordinate frame may be transformed to a camera coordinate frame C. The coordinate transform matrix $X_{N \to C}$ can be determined by calibration of the imaging device in accordance with known techniques. As an example, images of a set of targets with known coordinates in the world coordinate frame may be acquired. Using position, orientation, and rotation information associated with each image, $X_{W \to N}$ and $X_{W \to C}$ can be determined. $X_{N \to C}$ can then be determined as $X_{N \to C} = X_{W \to C} \cdot X_{N \to W} = X_{W \to C} \cdot X_{W \to N}^{-1}$. The camera calibration matrix K can also be determined in accordance with known techniques.

Using the above transforms, the coordinates of the object in the camera coordinate frame may be determined as $P_{wrtC} = X_{N \to C} \cdot X_{W \to N} \cdot P_{wrtW}$. Image coordinates (or pixel coordinates) associated with the location of the object may be determined by applying the camera calibration matrix K and dividing by the depth. For example, using image coordinates u,v having an origin at the center of the top left pixel of the image, with u coordinates increasing to the right and v coordinates increasing downward, the image coordinates associated with the location of the object may be determined as:

$$\begin{bmatrix} x \\ y \\ w \\ 1 \end{bmatrix} = K \cdot P_{wrtC}, \quad \begin{bmatrix} u \\ v \end{bmatrix} = \begin{bmatrix} x/w \\ y/w \end{bmatrix}.$$

The navigational graphic may be rendered relative to the image coordinates u,v associated with the location of the object. If the location of the object is outside the field of view of the imaging device 114, the navigational graphic may be rendered to identify a direction from the position of the imaging device to the location of the object.

It is to be understood that the navigational graphics may include many different forms and configurations and are not limited to those described herein. For example, the navigational graphics may include lines or arrows indicating the location of objects on the visual display. As an example, in an embodiment the navigational graphic may be an arrow extending from a position on the ground below the imaging device and extending to the location of an object or point. In other embodiments the navigational graphic may extend from the center or another location on the visual display to the location of the object. In some embodiments the characteristics of a navigational graphic, such as size, weight of lines, color, and the like, may depend on the attributes of the corresponding object and/or the distance between the position of the imaging device 114 and the object. Continuing with the above example, the width of a navigation graphic, for example the width of an arrow, may narrow as the navigational graphic extends to the location of the object or point on the visual display. Alternatively, the navigational graphics may include lines or concentric circles indicative of a distance to an object. Also, the navigational graphics may include virtual objects representative of real objects. For example, a navigational graphic may be a virtual object superimposed on the corresponding real object displayed on the visual display 126. Attribute information associated with the objects may be separately accessed, superimposed over the image data, or displayed in a separate window of the visual display 126. One of ordinary skill in the art would recognize many variations, modifications, and alternatives.

In some embodiments the objects or points may not be visible in the environment. For example, the object may be a cable or pipe that is buried underground, and the navigational graphic may be a virtual representation of the object superimposed on the corresponding location of the real object as described in commonly assigned U.S. Pat. No. 6,094,625, entitled "Augmented Vision for Survey Work and Machine Control," issued Jul. 25, 2000, the disclosure of which is incorporated herein by reference in its entirety for all purposes.

Figure 2:
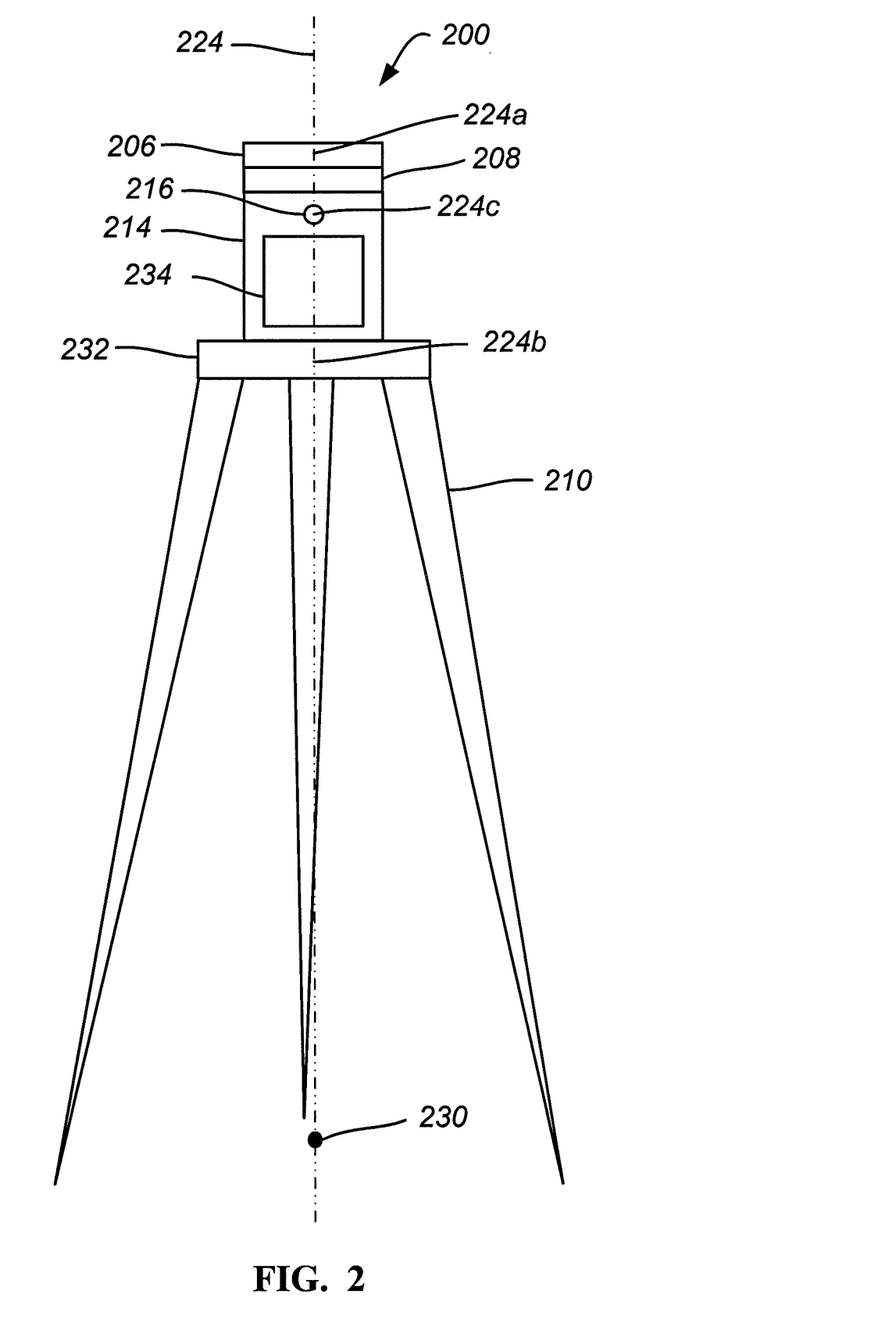
FIG. 2 is a simplified diagram of an apparatus for providing navigational information associated with locations of objects according to another embodiment of the invention.

FIG. 2 is a simplified diagram of an apparatus 200 for providing navigational information associated with locations of objects according to another embodiment of the invention. The apparatus 200 includes an imaging device 214, an antenna 206, and a receiver 208 mounted on a base 232 of a tripod 210. It is to be understood that FIG. 2 is provided merely as an example, however, and other arrangements are included within the scope of embodiments of the present invention.

The antenna 206 and the receiver 208 may be configured in a manner similar to that of antenna 106 and receiver 108 described above. For example, the receiver 208 may be configured to determine position information using signals received by antenna 206. In an embodiment the receiver 208 is configured to determine the position of the phase center 224a of the antenna 206. The phase center 224a of the antenna 206 and the vertical axis 224b of the tripod 210 are typically aligned along axis 224. Some embodiments also include a tilt sensor used to align the phase center 224a and the vertical axis 224b with the local gravity vector. For example, the tilt sensor may be coupled to the base 232, and when the base 232 is aligned with gravity the other components aligned with axis 224 are also aligned with gravity. With the phase center 224a aligned with gravity, the position of a point 230 on the ground may be determined by aligning the axis 224 with the point 230 and subtracting the distance between the point 230 and the phase center 224a of the antenna 206 in accordance with known techniques. The receiver 208 may be configured to send the position information to a control device similar to control device 104 described above and illustrated in FIG. 1. Alternatively, the receiver 208 may be configured to send the position information to the imaging device 214, and the imaging device 214 may be configured to perform many of the same functions as the control device 104 described above. The receiver 208 may be coupled with the control device or the imaging device 214 via wired or wireless connections.

The receiver 208 may also include an orientation device configured to determine an orientation of the imaging device 214 about a vertical axis, such as the local gravity vector. In an alternative embodiment, the orientation device may be separate from receiver 208 and may be, for example, coupled to tripod 210 or integrated with imaging device 214. In an embodiment the orientation device is a compass configured to provide orientation information to a control device similar to control device 104 described above or to the imaging device 214. The orientation device may be coupled with the control device or the imaging device 214 via wired or wireless connections.

The apparatus 200 also includes an imaging device 214. The imaging device 214 may be configured in a manner similar to that of imaging device 114 described above. For example, the imaging device 214 may be coupled with a control device similar to control device 104 described above. Alternatively, the imaging device 214 may be configured to perform many of the same functions as the control device 104 described above. As shown in the example illustrated in FIG. 2, the imaging device 214 may include a visual display 234 configured to display image data acquired by imaging device 214.

In an embodiment the entrance aperture 216 of the imaging device 214 is aligned along axis 224 such that axis 224 passes through the optical center 224c of the imaging device 214. The position of the optical center 224c may be determined based on the position of the phase center 224a of the antenna 206 in accordance with known techniques.

The imaging device 214 may also include an input device that includes a keyboard, touchscreen, touchpad, or the like configured to enable data input or retrieval. The imaging device 214 may also include a processor and memory and may be configured to receive position information from the receiver 208 and orientation information from the orientation device. Additionally, the imaging device 214 may be configured to store and access object information from local memory or a remote database.

In an embodiment the imaging device 214 may include a software- or hardware-based rendering system configured to determine the image coordinates associated with a location of an object or point as explained previously. The rendering system may be configured to superimpose navigational graphics on the real-time image data displayed on visual display 234.

Figure 3:
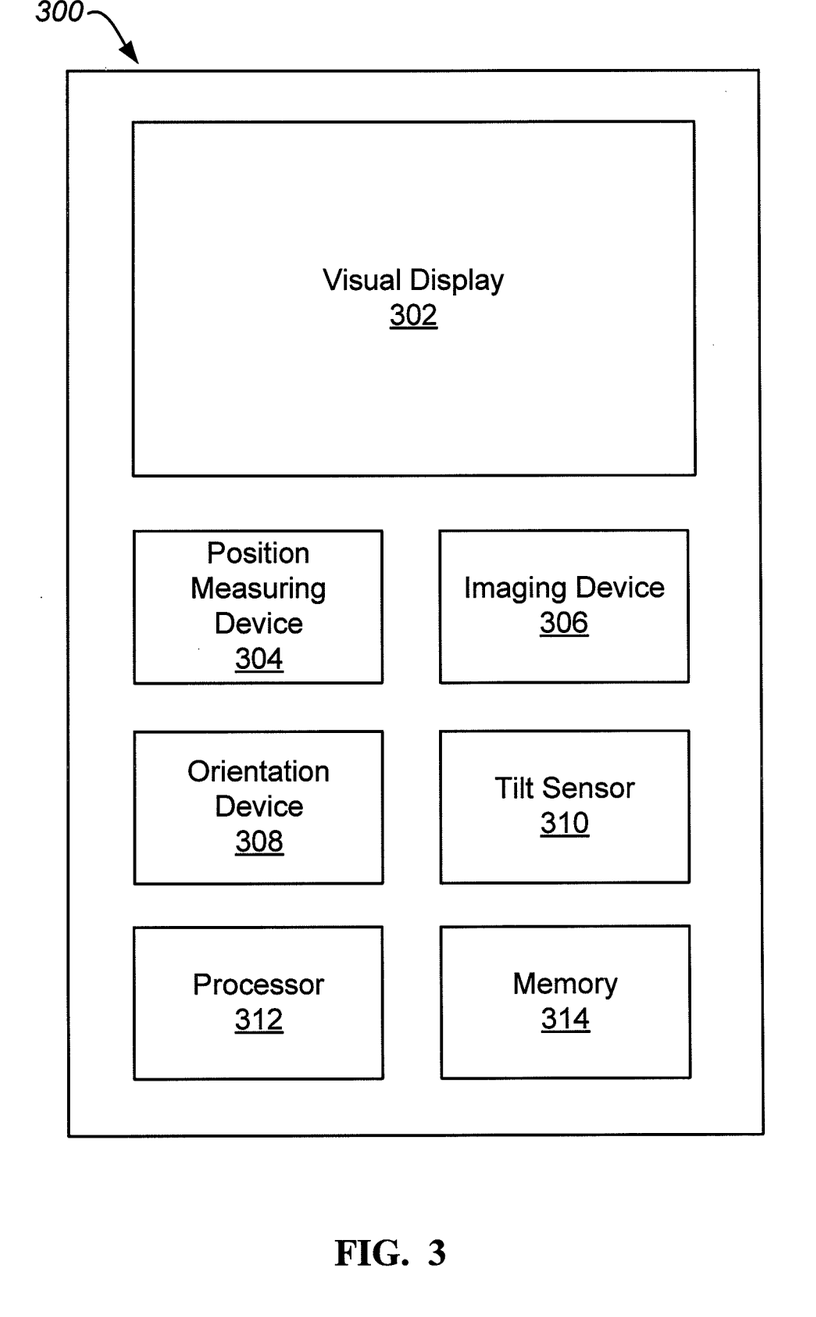
FIG. 3 is a simplified diagram of a handheld apparatus for providing navigational information associated with locations of objects according to an embodiment of the invention.

The apparatus 100 and 200 of FIGS. 1 and 2 can be provided in a variety of different forms and are not limited to the structures provided herein. For example, the receiver may be integrated with the antenna. Alternatively, the receiver may be integrated with the control device or the imaging device. In some embodiments the antenna, receiver, imaging device, orientation device, tilt sensor, and control device are combined in a single handheld unit. For example, FIG. 3 is a simplified diagram of an integrated handheld apparatus 300 for providing navigational information associated with locations of objects in accordance with an embodiment of the invention. The apparatus 300 includes a visual display 302, a position measuring device 304, an imaging device 306, an orientation device 308, a tilt sensor 310, a processor 312, and a memory 314. The apparatus 300 may also include an input device as illustrated in relation to the control device 104 of FIG. 1.

The position measuring device 304 may include an antenna and receiver and be configured to determine position information. For example, the position measuring device 304 may comprises a GNSS antenna/receiver. In some embodiments the receiver may be integrated with processor 312. Similar to antenna 106 and receiver 108 illustrated in FIG. 1, the position measuring device 304 may be configured to determine the position of the phase center of the antenna.

The imaging device 306 may include a digital camera and be configured to acquire image data. For example, the imaging device 306 may include a digital video camera as described above with regard to imaging device 114. The imaging device 306 may be configured to display the image data acquired by the imaging device on the visual display 302. In an embodiment, the imaging device 306 includes an entrance aperture (not shown) disposed on the apparatus 300 in a fixed position relative to the antenna of the position measuring device 304. The position of the optical center of the imaging device may be determined in accordance with known techniques. For example, the position of the optical center of the imaging device 306 may be determined based on data from the manufacturer of the imaging device 306. An offset between the position of the optical center of the imaging device 306 and the phase center of the antenna can be determined and stored in memory 314. For example, the offset may be determined as a delta x, delta y, and delta z with reference to a coordinate system centered within the apparatus 300.

The orientation device 308 may include an orientation sensor such as a compass and be configured to determine an orientation of the apparatus 300 about a vertical axis, such as one defined by the local gravity vector. Alternatively, the orientation device may include a software based system configured to determine orientation information based on position information received from the position measuring device 304. For example, position information may be determined based on movement of the apparatus 300 in accordance with known techniques.

The apparatus 300 may also include one or more conventional tilt sensors 310. The tilt sensors 310 may be configured to determine rotation of the apparatus 300 about the horizontal axes (e.g. pitch and roll) with reference to a coordinate system centered within. Pitch and roll can be constrained by using the tilt sensors to align the apparatus 300 with the local gravity vector. Alternatively, the tilt sensors 310 can be used to determine the magnitude of the rotation of the apparatus 300 about the horizontal axes.

The apparatus 300 also typically includes one or more processors 312 and a memory 314. The memory 314 may be local and/or remote. The memory 314 may include object location information such as GNSS coordinates of objects, digital models of the environment, and/or attribute information. The processor 312 is typically coupled with the position measuring device 304, the imaging device 306, the orientation device 308, and the tilt sensor 310. The processor 312 may be configured to determine the image coordinates associated with a location of an object as described previously.

Figure 4:
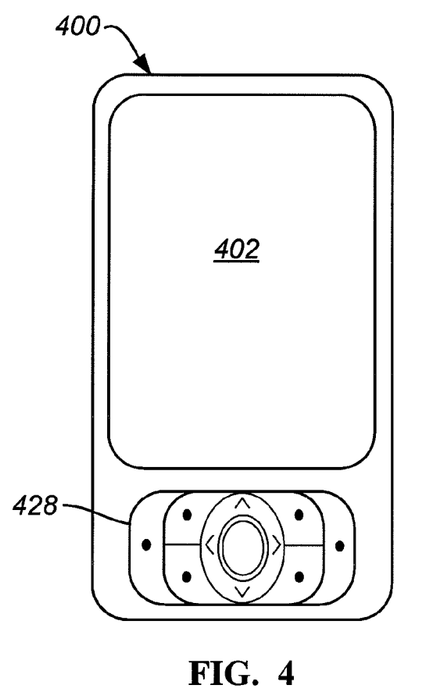
FIG. 4 is a simplified diagram of a handheld apparatus for providing navigational information associated with locations of objects according to another embodiment of the invention.

The handheld apparatus 300 shown in FIG. 3 can be embodied in a number of different configurations and integrated with a number of different devices. For example, FIG. 4 is a simplified diagram of a handheld apparatus 400 for providing navigational information associated with locations of objects according to another embodiment of the invention. In this embodiment, the handheld apparatus 400 may be integrated with a handheld controller unit, such as a Juno SC Handheld or GeoXH Handheld from Trimble Navigation Limited of Sunnyvale, Calif. The apparatus 400 may include a visual display 402 and an input device 428 configured to enable data input or retrieval. The input device 428 may include a keyboard, touchscreen, touchpad, or the like. The apparatus 400 shown in FIG. 4 may include an imaging device, a position measuring device, an orientation device, one or more tilt sensors, a processor, and/or a memory. Each of these components and/or functionality may be integrated with or separate from the survey and construction functionality and may be configured in a manner similar to that described above with regard to FIG. 3.

Figure 5:
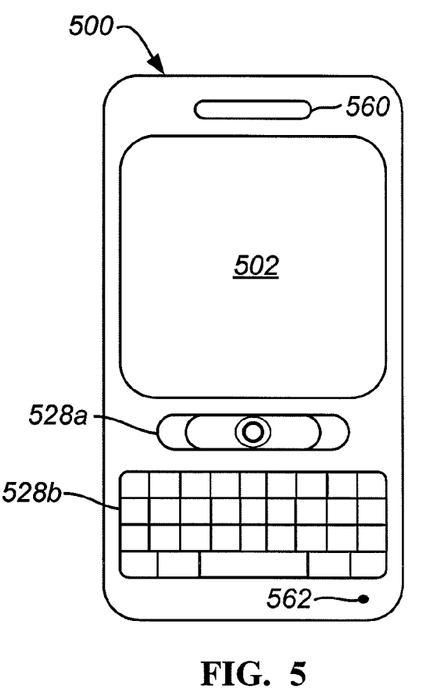
FIG. 5 is a simplified diagram of a handheld apparatus for providing navigational information associated with locations of objects according to another embodiment of the invention.

FIG. 5 is a simplified diagram of a handheld apparatus 500 for providing navigational information associated with locations of objects according to another embodiment of the invention. In this embodiment, the handheld apparatus 500 may be integrated with a conventional cell phone or PDA. The apparatus 500 may include a speaker 560 and microphone 562 when integrated with a cell phone. The apparatus 500 may include a visual display 502 and input devices 528a, 528b configured to enable data input or retrieval. The input devices 528a, 528b may also include a keyboard, touchscreen, touchpad, or the like. The apparatus 500 shown in FIG. 5 may include an imaging device, a position measuring device, an orientation device, one or more tilt sensors, a processor, and/or a memory. Each of these components and/or functionality may be integrated with or separate from the cell phone or PDA components and/or functionality and may be configured in a manner similar to that described above with regard to FIG. 3.

Figure 6A:
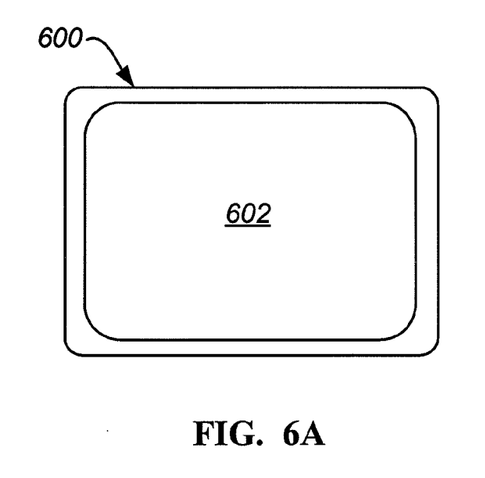
FIGS. 6A-6B are simplified diagrams of a handheld apparatus for providing navigational information associated with locations of objects according to another embodiment of the invention.
Figure 6B:
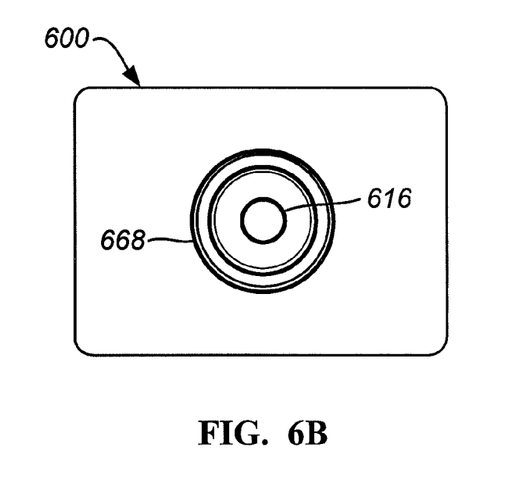

FIGS. 6A-6B are simplified diagrams of a handheld apparatus 600 for providing navigational information associated with locations of objects according to another embodiment of the invention. In this embodiment, the handheld apparatus 600 may be integrated with a conventional digital video camera. FIG. 6A shows a back view of the apparatus 600 with a visual display 602. FIG. 6B shows a front view of the apparatus 600 with a lens 668 and an entrance aperture 616. The apparatus 600 may include an input device configured to enable data input or retrieval. The input device may include a keyboard, touchscreen, touchpad, or the like. The apparatus 600 shown in FIG. 6 may include an imaging device, a position measuring device, an orientation device, one or more tilt sensors, a processor, and/or a memory. Each of these components and/or functionality may be integrated with or separate from the digital video camera components and/or functionality and may be configured in a manner similar to that described above with regard to FIG. 3.

Figure 7:
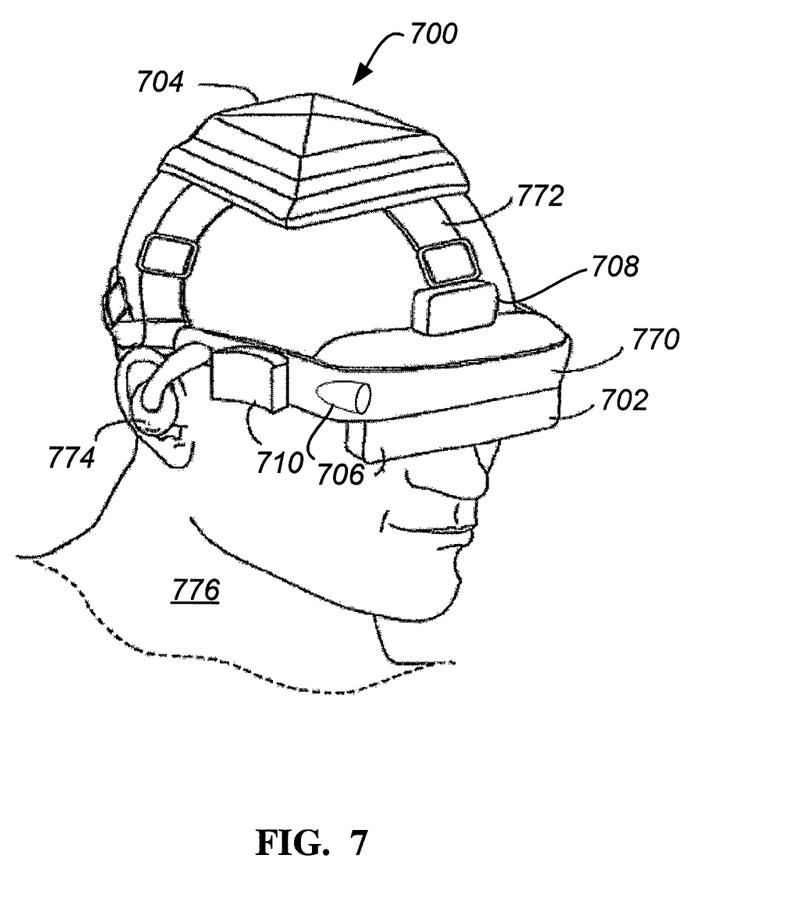
FIG. 7 is a simplified diagram of a head mounted apparatus for providing navigational information associated with locations of objects according to another embodiment of the invention.

FIG. 7 is a simplified diagram of a head mounted apparatus 700 for providing navigational information associated with locations of objects according to another embodiment of the invention. One of ordinary skill in the art would recognize that a variety of different headsets could be used for this particular purpose. The apparatus 700 includes a frame 770 and straps 772 that can be adjusted to fit the head of the wearer comfortably and securely. The imaging device 706 acquires image data that can be displayed on visual display 702. Navigational graphics that provide navigational information associated with locations of objects can be superimposed on the image data as explained previously. The apparatus 700 may also include a position measuring device 704, an orientation device 708, one or more tilt sensors 710, and/or a processor and memory. Alternatively, one or more of these components may be integrated with an accompanying handheld device or a measurement pole. For example, the position measuring device 704 may be integrated with a measurement pole, or the processor and memory may be integrated with a handheld control device. Each of these components may be configured in a manner similar to that described above with regard to FIG. 3. The apparatus 700 may also include earphones 774 to provide sound to accompany the image data displayed on visual display 702.

In an embodiment the apparatus 700 provides a rigid mount for the imaging device 706, the position measuring device 704, the orientation device 708, and the tilt sensor 710. A fixed offset between the position measuring device 704 and the imaging device 706 allows the position of the imaging device 706 to be determined. Position information, orientation information, and rotation information can be used as explained previously to determine the image coordinates associated with locations of points or objects. Navigational graphics may be provided on the visual display 702 that provide navigational information associated with the locations of the objects.

Figure 8:
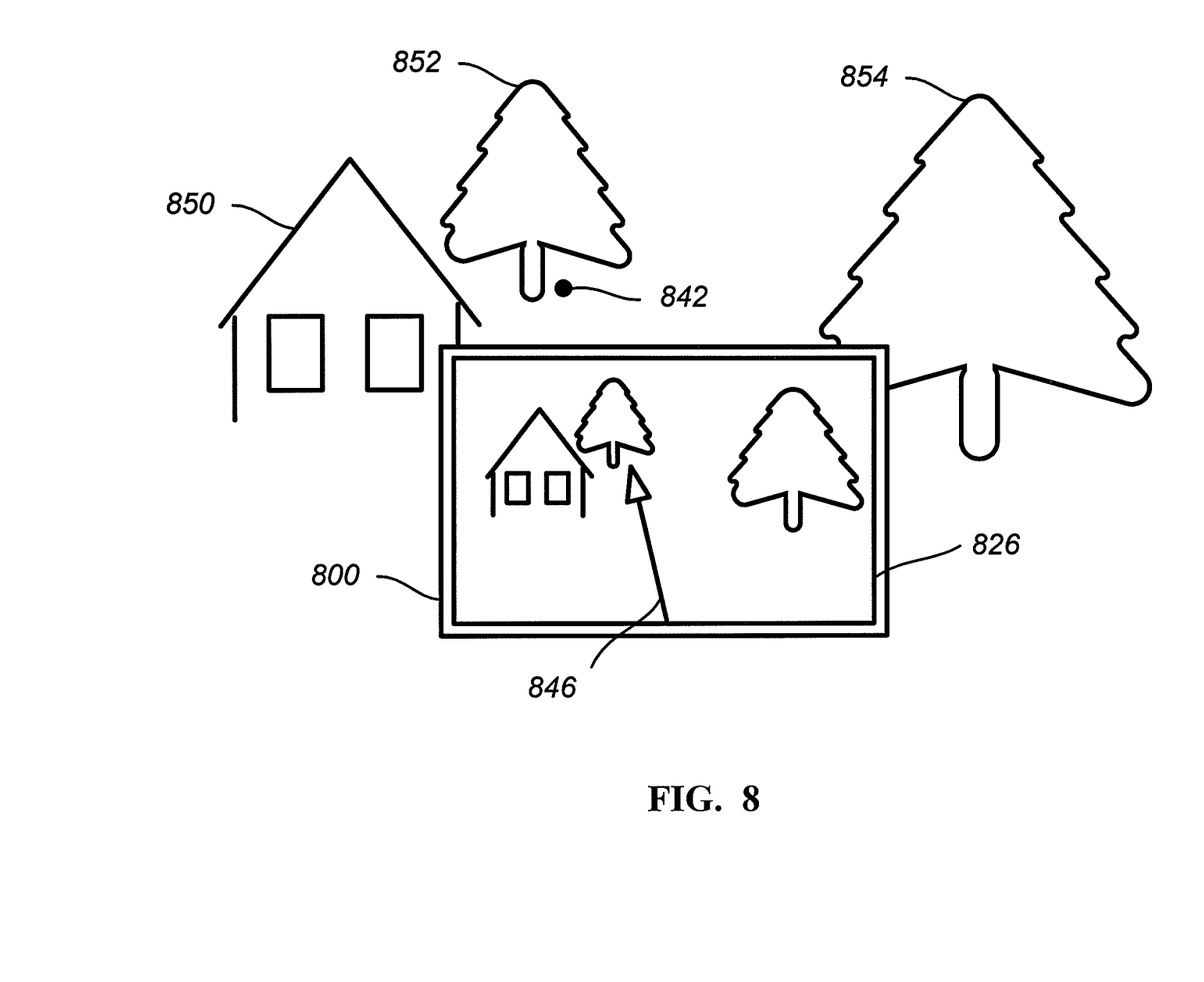
FIG. 8 is a simplified diagram illustrating operation of an apparatus for providing navigational information associated with locations of objects according to an embodiment of the invention.

FIG. 8 is a simplified diagram illustrating operation of an apparatus 800 for providing navigational information associated with locations of objects according to an embodiment of the invention. As shown in this example, the apparatus 800 includes a visual display 826. The visual display 826 is configured to display image data acquired by an imaging device. The imaging device may be integrated with the apparatus 800, or it may be integrated with another part of the apparatus such as a measurement pole or a tripod as explained above with regard to the examples shown in FIGS. 1-2. Alternatively, the apparatus may be an integrated handheld unit similar to that shown in FIGS. 3-6 above. Although not shown in FIG. 8, the apparatus 800 may include a position measuring device for determining position information, an orientation device for determining orientation information, one or more tilt sensor for obtaining rotation information, and an input device for data input or retrieval. The apparatus typically includes one or more conventional processors and memory configured to carry out the operations described herein to provide navigational information associated with the location of objects or points in the environment.

In the example shown in FIG. 8, the objects in the environment include a house or structure 850 and trees 852 and 854. Of course an infinite number of points would also be included in the environment such as point 842. As shown on the visual display 826, each of these objects are within the field of view of the imaging device. It is also apparent that point 842 next to tree 852 is within the field of view of the imaging device despite not having any visible physical features. The apparatus 800 may be configured to determine the image coordinates associated with the location of the point 842 as explained previously. In this example, the point 842 is within the field of view of the imaging device and the apparatus 800 provides a navigational graphic 846 on the visual display 826 indicating the location of the point 842.

In some embodiments the world coordinates of the point 842 may be entered by the operator or selected by the operator from a list of points. In other embodiments the apparatus 800 may include or be configured to access a digital model of the surrounding environment. For example, the digital model may be stored in memory or accessed from a remote database. The digital model may comprise locations of points measured, for example, using an optical/electronic total station. The digital model may be used to select objects or points of interest as described previously. Additionally, the digital model may be used to determine if objects or points of interest are within a line-of-sight of the apparatus 800. If the object or point is not within a line-of-sight of the apparatus 800, the navigational graphic may be different, for example a different color, than when the object or point is within a line-of-sight of the apparatus 800. Attribute information may also be provided indicating whether an object is within a line-of-sight of the apparatus 800. One of ordinary skill in the art would recognize many variations, modifications, and alternatives.

The navigational graphic 846 illustrated in FIG. 8 is in the form of an arrow. As explained previously, however, the navigational graphic 846 is not limited to this particular form. For example, in some embodiments the navigational graphic 846 may be in the form of the object with which it is associated. Also, the form of the navigational graphic 846 may be dependent on other factors such as the distance to the object or point. Attribute information associated with the point 842 may also be displayed on visual display 826. Attribute information may include, for example, a description of the point, a distance to the point, the GNSS coordinates of the point, or other information. One of ordinary skill in the art would recognize many variations, modifications, and alternatives.

Although not shown in FIG. 8, the apparatus 800 may be configured to provide more than one navigational graphic on the visual display 826 simultaneously. For example, in one embodiment more than one navigational graphic may be provided to indicate the location of the point 842. In another embodiment more than one navigational graphic may be provided to indicate the locations of more than one point. Also, in some embodiments the image coordinates associated with the location of the object are determined at a specified frequency and the navigational graphic is updated accordingly. The frequency can be specified such that updates are perceived to occur in near real-time. For example, the frequency can be specified such that if the apparatus 800 were moved, the navigational graphic 846 would follow the location of the point 842 on the display 826.

Figure 9:
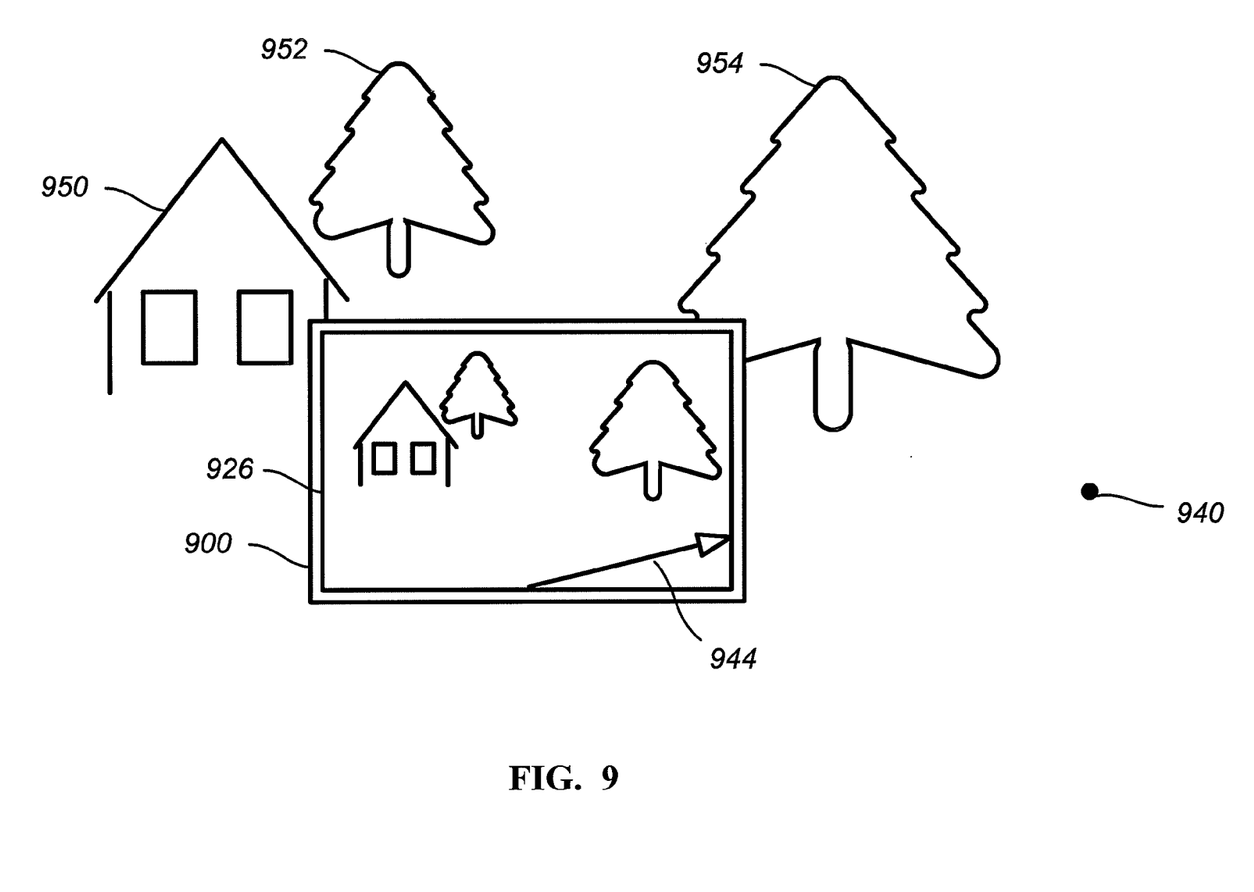
FIG. 9 is a simplified diagram illustrating operation of an apparatus for providing navigational information associated with locations of objects according to another embodiment of the invention.

FIG. 9 is a simplified diagram illustrating operation of an apparatus 900 for providing navigational information associated with locations of objects according to another embodiment of the invention. The objects in the environment shown in FIG. 9 include a house or structure 950 and trees 952 and 954. As explained previously, an infinite number of points would also be included in the environment such as point 940. As shown on the visual display 926 of apparatus 900, the house 950 and the trees 952 and 954 are within the field of view of the imaging device. The point 940, however, is outside the field of view of the imaging device. In this example, apparatus 900 provides a navigational graphic 944 on the visual display 926 indicating a direction to the location of the point 940. The navigational graphic 944 may indicate to the operator a direction in which to look or walk in order to locate the real object or point. In an embodiment, the image coordinates associated with the location of the object are continuously determined and the navigational graphic is updated accordingly such that if the imaging device were panned to the right, the navigational graphic 944 would transition seamlessly as the point 940 enters the field of view of the imaging device. In other embodiments, if the point is outside the field of view of the imaging device, the navigational graphic may be in the form of a horizontal arrow pointing to the left or right indicating the direction to pan the imaging device to bring the point within the field of view of the imaging device. One of ordinary skill in the art would recognize many variations, modifications, and alternatives.

Figure 10:
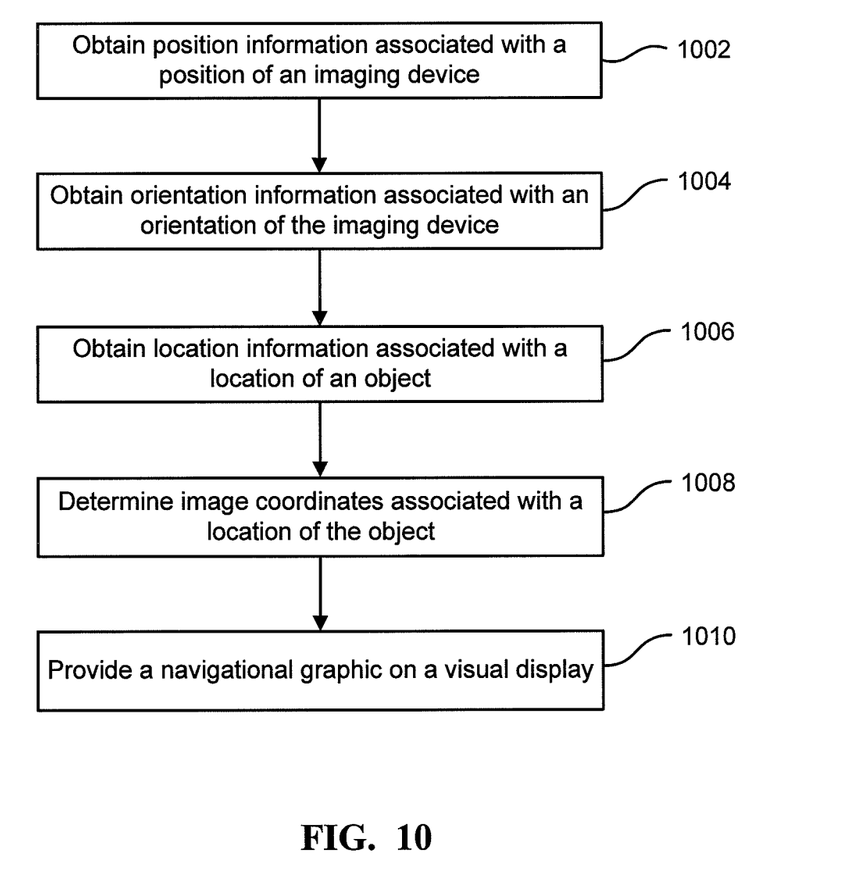
FIG. 10 is a simplified flowchart illustrating a method of providing navigational information associated with a location of an object according to an embodiment of the invention.

FIG. 10 is a simplified flowchart illustrating a method of providing navigational information associated with a location of an object according to an embodiment of the invention. The method includes obtaining position information associated with a position of an imaging device (1002). In some embodiments the position information may include the position of the optical center of the imaging device. The position information may be obtained from a position measuring device. In some embodiments the position measuring device comprises a GNSS antenna/receiver. The method also includes obtaining orientation information associated with an orientation of the imaging device (1004). In some embodiments the orientation information may be obtained from an orientation device. The orientation information may be used to determine an orientation of the imaging device about a vertical axis. Some embodiments may also include obtaining rotation information associated with the imaging device. The rotation information may be obtained from one or more tilt sensors. The rotation information may be used to determine a rotation of the imaging device about horizontal axes. The method also includes obtaining location information associated with a location of an object or point (1006). In some embodiments the location information may be obtained from a memory or a remote database.

The method also includes determining the image coordinates associated with a location of an object or point (1008). This may involve using position, orientation, and/or rotation information. The method also includes providing a navigational graphic on a visual display (1010). The navigational graphic may be oriented relative to the image coordinates associated with the location of the object. In some embodiments the navigational graphic may be in the form of an arrow and indicate the position on the visual display corresponding to the location of the object. If the object or point is not within the field of view of the imaging device the navigational graphic may be oriented to indicate a direction from the current position to the location of the object or point.

It should be appreciated that the specific steps illustrated in FIG. 10 provide a particular method of providing navigational information associated with a location of an object according to an embodiment of the present invention. The steps outlined above may be continuously repeated by system software. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 11:
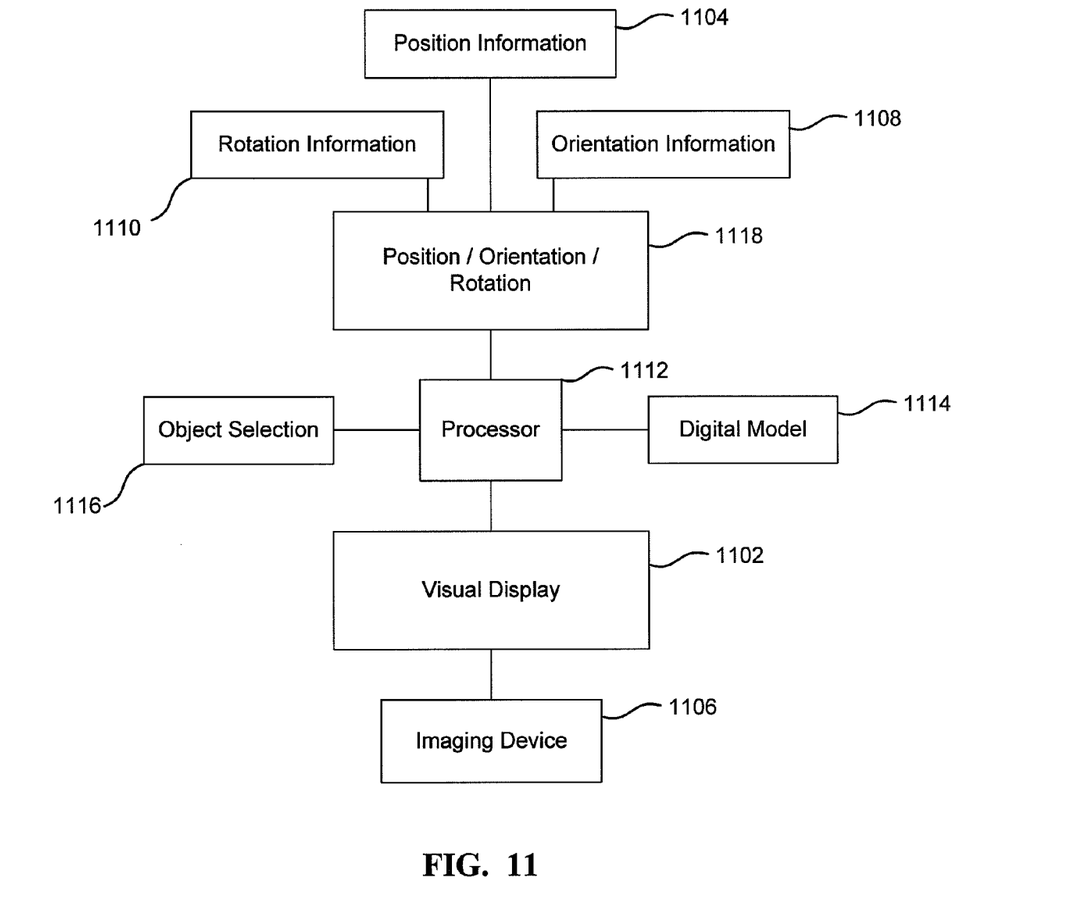
FIG. 11 is a simplified block diagram of an apparatus for providing navigational information associated with locations of objects according to an embodiment of the invention.

FIG. 11 is a simplified block diagram of an apparatus for providing navigational information associated with locations of objects according to an embodiment of the invention. FIG. 11 shows position information 1104, orientation information 1108, and rotation information 1110 provided to position/orientation/rotation system 1118. The position information 1104 may be provided by GNSS or an optical total station in accordance with known techniques. The orientation information 1108 may be provided by a compass, magnetometer and one or more gyros, or the like. The rotation information 1110 may be provided by one or more gyros, magnetometers, accelerometers, or the like. The position/orientation/rotation system 1118 may include a processor configured to receive and analyze the information as described previously.

FIG. 11 also shows an object selection system 1116. The object selection system 1116 may include an input device configured to facilitate selection of an object by an operator. For example, the object selection system 1116 may enable entry of GNSS or GPS coordinates of a point, selection of a point from a list of points, or selection of a point from a digital model 1114. The digital model 1114 may be stored in local memory or accessed from a remote database.

FIG. 11 also includes an imaging device 1106. The imaging device 1106 may be configured to acquire image data and provide the image data to visual display 1102. In this example, the visual display 1102, the object selection system 1116, the digital model 1114, and the position/orientation/rotation system 1118 are each coupled to processor 1112. The processor 1112 may include one or more processors configured to determine the image coordinates associated with locations of objects and to generate and superimpose navigational graphics on the visual display 1102 as described previously.

It is to be understood that the features of one or more embodiments of the invention may be combined with one or more features of other embodiments of the invention without departing from the scope of the invention. Also, the examples and embodiments described herein are for illustrative purposes only and various modifications or changes in light thereof will be suggested to persons skilled in the art and are to be included within the spirit and purview of this application and scope of the appended claims.

What is claimed is:

1. An apparatus for providing navigational information associated with locations of objects comprising:
   an imaging device configured to acquire image data, the imaging device calibrated to enable transformation between three-dimensional coordinates of the objects in space and corresponding two-dimensional image coordinates of the image data in an image plane;
   a visual display coupled to the imaging device and configured to display the image data;
   a position measuring device disposed in a fixed position relative to the imaging device and configured to determine position information associated with the imaging device;
   one or more tilt sensors configured to measure a pitch and a roll of the imaging device;
   an orientation device configured to determine orientation information associated with the imaging device; and
   a rendering system coupled to the visual display, the position measuring device, the one or more tilt sensors, and the orientation device, the rendering system configured to:
   obtain three-dimensional coordinates of a location of an object;
   using the three-dimensional coordinates, calibration of the imaging device, and one or more transformations, determine two-dimensional image coordinates of the image data in the image plane that are associated with the location of the object; and provide a navigational graphic on the visual display oriented relative to the two-dimensional image coordinates of the image data in the image plane.

2. The apparatus of claim 1 wherein the processor is configured to obtain the three-dimensional coordinates of the location of the object from a memory.

3. The apparatus of claim 1 wherein the processor is configured to obtain the three-dimensional coordinates of the location of the object from a remote database.

4. The apparatus of claim 1 wherein the orientation information includes an orientation of the imaging device about a vertical axis.

5. The apparatus of claim 1 wherein the orientation information is determined using the position information provided by the position measuring device.

6. The apparatus of claim 1 wherein the orientation device is a compass configured to provide an orientation of the imaging device about a vertical axis.

7. The apparatus of claim 1 wherein the visual display is wirelessly coupled to the imaging device.

8. The apparatus of claim 1 wherein the position measuring device comprises a GNSS receiver.

9. The apparatus of claim 1 wherein the navigational graphic is in the form of an arrow extending toward the image coordinates associated with the location of the object.

10. The apparatus of claim 1 wherein the imaging device, the visual display, the position measuring device, the one or more tilt sensors, the orientation device, and the rendering system are integrated in a handheld unit.

11. An apparatus for providing navigational information associated with locations of objects comprising:

an imaging device configured to acquire image data, the imaging device calibrated to enable transformation between three-dimensional coordinates of the objects in space and corresponding two-dimensional image coordinates of the image data in an image plane;

a visual display coupled to the imaging device and configured to display the image data;

a position measuring device disposed in a fixed position relative to the imaging device and configured to determine a position of the imaging device;

an orientation device configured to determine an orientation of the imaging device about a vertical axis;

a rotation sensor configured to determine rotation of the imaging device about a horizontal axis; and one or more processors coupled to the visual display, the position measuring device, the orientation device, and the rotation sensor, the one or more processor configured to:

obtain three-dimensional coordinates of a location of an object;

using the three-dimensional coordinates, calibration of the imaging device, and one or more transformations, determine two-dimensional image coordinates of the image data in the image plane that are associated with the location of the object; and provide a navigational graphic on the visual display oriented relative to the two-dimensional image coordinates of the image data in the image plane.

12. The apparatus of claim 11 wherein the rotation of the imaging device about the horizontal axis includes pitch and roll.

13. The apparatus of claim 11 wherein the imaging device, the visual display, the position measuring device, the orientation device, the rotation sensor, and the one or more processors are integrated in a handheld unit.

14. A method of providing navigational information associated with a location of at least one object, the method comprising:

acquiring image data using an imaging device, the imaging device calibrated to enable transformation between three-dimensional coordinates of an object in space and corresponding two-dimensional image coordinates of the image data in an image plane;

determining position information associated with a position of the imaging device;

obtaining rotation information associated with a rotation of the imaging device about a horizontal axis;

determining orientation information associated with an orientation of the imaging device;

obtaining three-dimensional coordinates of the location of the object;

using the three-dimensional coordinates, calibration of the imaging device, and one or more transformations, determining two-dimensional image coordinates on an image plane that are associated with the location of the object; and providing a navigational graphic on a visual display oriented relative to the two-dimensional image coordinates of the image data in the image plane.

15. The method of claim 14 wherein the orientation of the imaging device is about a vertical axis.

16. The method of claim 14 wherein the navigational graphic is superimposed on the image data.

17. The method of claim 14 wherein the navigational graphic is in the form of an arrow.

18. The method of claim 14 wherein the position information is determined using a GNSS antenna and receiver.

19. The method of claim 14 wherein the two-dimensional image coordinates are on a portion of the image plane that is outside a field of view of the imaging device.

20. The method of claim 14 wherein the image coordinates correspond to a portion of the image data.

* * * * *